(12) United States Patent
Zarrini et al.

(10) Patent No.: US 10,467,087 B2
(45) Date of Patent: Nov. 5, 2019

(54) PLATO ANOMALY DETECTION

(71) Applicant: AirMagnet, Inc., Santa Clara, CA (US)

(72) Inventors: Daniel Zarrini, Parker, CO (US); Peter Reilly, Colorado Springs, CO (US); Michael Faughan Sleevi, Parker, CO (US)

(73) Assignee: AirMagnet, Inc., Santa Clara, CA (US)

( * ) Notice: Subject to any disclaimer, the term of this patent is extended or adjusted under 35 U.S.C. 154(b) by 122 days.

(21) Appl. No.: 15/725,202

(22) Filed: Oct. 4, 2017

(65) Prior Publication Data

US 2019/0102240 A1 Apr. 4, 2019

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0775* (2013.01)

(58) Field of Classification Search
CPC .............. G06F 11/0757; G06F 11/079; G06F 11/3428; G06F 11/3447; G06F 11/3452
See application file for complete search history.

(56) References Cited

U.S. PATENT DOCUMENTS

| | | | | |
|---|---|---|---|---|
| 7,484,132 B2* | 1/2009 | Garbow | ................ | G06F 11/008 714/26 |
| 7,969,893 B2* | 6/2011 | Ryan | ................... | H04L 41/0681 370/241 |
| 8,938,532 B2* | 1/2015 | Terrell | ................ | H04L 41/5009 709/224 |
| 9,430,318 B2 | 8/2016 | Aggarwal et al. | | |
| 10,122,599 B2* | 11/2018 | Monk | ..................... | H04L 43/04 |
| 10,235,638 B2* | 3/2019 | Maheshwari | .......... | G06N 20/00 |
| 2003/0079160 A1* | 4/2003 | McGee | ............... | G06F 11/0709 714/39 |
| 2008/0016412 A1* | 1/2008 | White | ................. | G06F 11/3409 714/48 |
| 2009/0018996 A1* | 1/2009 | Hunt | ...................... | G06Q 30/02 |
| 2009/0106174 A1* | 4/2009 | Battisha | .............. | H04L 41/0681 706/12 |
| 2010/0083055 A1* | 4/2010 | Ozonat | ............... | G06F 11/0709 714/47.2 |
| 2013/0318236 A1* | 11/2013 | Coates | .................... | H04L 41/22 709/224 |
| 2016/0103891 A1* | 4/2016 | Choudhary | ........... | G06F 16/248 707/722 |
| 2016/0147583 A1* | 5/2016 | Ben Simhon | ......... | G06F 11/076 714/47.3 |

OTHER PUBLICATIONS

JJG Adeva, Serving Text-Mining Functionalities with the Software Architecture Plato (Year: 2006).*

* cited by examiner

*Primary Examiner* — Elmira Mehrmanesh
(74) *Attorney, Agent, or Firm* — Locke Lord LLP; Scott D. Wofsy; Christopher J. Capelli (57) ABSTRACT

A method for continuous data anomaly detection includes identifying a period of time covered by metrics data stored in a repository. The stored metrics data is categorized into a plurality of non-overlapping time segments. Statistical analysis of the stored metrics data is performed based on the identified period of time. A range of acceptable metric values is dynamically generated based on the performed statistical analysis.

7 Claims, 3 Drawing Sheets

PLATO ANOMALY DETECTION

FIELD OF THE INVENTION

Embodiments of the present invention relate generally to methods and systems for analyzing data, and specifically to data plato anomaly detection.

BACKGROUND OF THE INVENTION

In the field of information technology, various types of metrics data, including numerical and unstructured metrics data, for applications and networks are collected in order to monitor application and network performance. When performance degradation occurs, these collected metrics may be analyzed via correlation to diagnose probable root cause(s). Correlating the collected metrics may allow for the identification of the metrics most correlated to a problematic metric associated with the performance degradation. However, as the number of applications and sampled data for disparate metrics collected per application increases, traditional monitoring systems should find relevant "information" out of a vast number of collected metrics. Beyond the sheer and increasing number of application metrics, applications are also operating on increasingly finer-grained data, such as finer time resolutions for performance data. This finer-grained data further increases the amount of sampled data. The monitoring systems, in the process of turning data into information, typically help users by determining various characteristics of data and by making it clear why certain information is interesting. To help accomplish this goal, many monitoring systems compile and analyze data using "baselines" or "thresholds" which dictate rules regarding expectations for the metric data. For example, a rule for CPU usage may state that "CPU usage can't be more than 90%." In this example, for instance, envision that data center support (IT support) personnel may need to receive a notification indicating that the metric increases above the pre-defined baseline.

It is desirable to have systems that are well equipped to quickly and efficiently identify various data anomalies.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for continuous data anomaly detection includes identifying a period of time covered by metrics data stored in a repository. The stored metrics data is categorized into a plurality of non-overlapping time segments. Statistical analysis of the stored metrics data is performed based on the identified period of time. A range of acceptable metric values is dynamically generated based on the performed statistical analysis.

In another aspect, a system for continuous data anomaly detection is provided. The system includes a repository configured to store metrics data. The system further includes an information processing system including a processor and a memory device coupled to the processor in communication with the repository. The memory device contains a set of instructions that, when executed by the processor, cause the processor to identify a period of time covered by the metrics data stored in the repository. The set of instructions that, when executed by the processor, further cause the processor to categorize the stored metrics data into a plurality of non-overlapping time segments and to perform statistical analysis of the stored metrics data based on the identified period of time. The set of instructions that, when executed by the processor, also cause the processor to dynamically generate a range of acceptable metric values based on the performed statistical analysis.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

Data centers typically include a number of different infrastructure devices that support the operation of server devices within the data center or the server environment generally. In some instances, the infrastructure devices may fail and require some human intervention to recover the infrastructure devices or the infrastructure devices may simply be replaced. To prevent and/or anticipate device failures various data centers typically employ one or more infrastructure monitoring systems. As previously indicated, many monitoring systems compile and analyze the collected metrics data using a plurality of rules regarding expectations for the metric data (e.g., baselines or thresholds), such as the aforementioned CPU usage rule. At large scale, however, such simple rule-based classifiers of monitoring data which analyze the data at fixed time intervals are typically insufficient. Some infrastructure devices will always run at a high CPU utilization and predefined static thresholds for monitoring data related to such infrastructure device may be meaningless in most situations. Other predefined static thresholds may be much lower, and data center support personnel might want to be notified when a certain predefined threshold has been exceeded (e.g., when a CPU utilization metric exceeds 70%). However, certain infrastructure device's CPU might spike every morning at around 9 am when the users arrive at work, and that early morning spike might not be very "interesting" from infrastructure monitoring perspective.

Embodiments of the present invention are directed to automatically monitoring the health of infrastructure devices within a data center and providing automatically determined dynamic ranges of acceptable values for every individual metric on every individual infrastructure device. Various infrastructure devices may include, but are not limited to, servers, routers and switches. Because infrastructure devices support server devices running various applications, the health monitoring and recovery operations are selected and performed in a manner that helps users (e.g., data center support personnel) to find valuable information in large amounts of data relating to data accesses, application performance, operating system performance, network performance, etc. This may include plato anomaly detection method which creates meaningful dynamic baselines (also referred to herein as "ranges of acceptable metric values"), incorporating historical information about past performance of various infrastructure components. Embodiments described herein use variations in generation of such dynamic baselines in a way that helps detect an odd behavior of a particular infrastructure device, while at the same time minimizing "false positives", where data center support personnel is notified about something that is not really a problem. Advantageously, health monitoring may be performed using a learning technique that determines valuable information right away and that improves over time.

As used herein, "health" of an infrastructure device refers to the ability of the infrastructure device to perform normal operations for that type of device. Accordingly, an infrastructure device may have various failure modes that affect only a portion of the operations of that device that impact the health of the device. Health monitoring for an infrastructure device may be performed when a device is suspected to be unhealthy or according to a timed schedule (which may be configurable).

Figure 1:
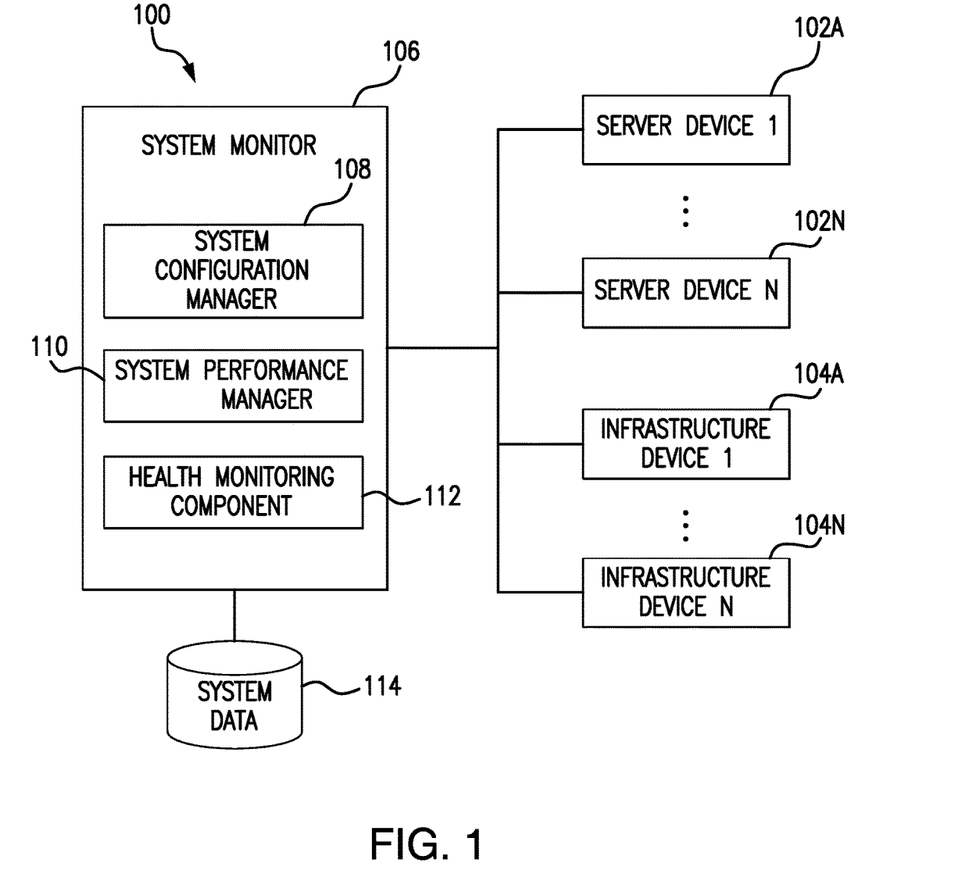
FIG. 1 is a block diagram of an exemplary data center architecture in which embodiments of the invention may be employed.

With reference to FIG. 1, a block diagram is provided illustrating an exemplary data center 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the data center 100 includes server devices 102A, 102N, infrastructure devices 104A, 104N, and a system monitor 106. It should be understood that the system 100 shown in FIG. 1 is an example of one suitable data center architecture. The data center 100 should not be interpreted as having any dependency or requirement related to any single module/component or combination of modules/components illustrated therein. Each may comprise a single device or multiple devices cooperating in a distributed environment. For instance, the system monitor 106 may comprise multiple devices arranged in a distributed environment that collectively provide the functionality described herein. Additionally, other components not shown may also be included within the network environment.

The data center 100 includes a number of server devices, such as server devices 102A, 102N. Although only two server devices are shown in FIG. 1, it should be understood that in practice, data centers typically include a large number of server devices. Each of the server devices are responsible for hosting and running service applications that provide some service to client devices external to the data center 100. The data center 100 also includes a number of infrastructure devices, such as infrastructure devices 104A, 104N. Although only two infrastructure devices are shown in FIG. 1, it should be understood that in practice, data centers typically include a large number of infrastructure devices of varying types. In contrast to the server devices, the infrastructure devices do not host or run any service applications. Instead, the infrastructure devices support the server devices and/or the server environment generally. By way of example only and not limitation, the infrastructure devices may include power distribution units (PDUs), serial aggregators, thermostats, network routers and network switches, to name a few.

The system monitor 106 generally operates to monitor server devices and infrastructure devices in the data center, such as the server devices 102A, 102N and infrastructure devices 104A, 104N, respectively, by performing health analysis operations for the server and infrastructure devices. As shown in FIG. 1, the system manager 106 includes, among other components not shown, a system configuration manager 108, system performance manager 110 and health monitoring component 112.

The system configuration manager 108 operates to collect information regarding infrastructure devices, such as the infrastructure devices 104A, 104N, and server devices, such as the server devices, 102A, 102N, within the data center and to store the information in a system data repository 114. The information may be entered manually by a system administrator and/or accessed by the system configuration manager 108 querying infrastructure devices and/or server devices connected in the data center.

Information collected for infrastructure devices may include device information for each of the infrastructure devices. The device information may include information identifying a type of device for an infrastructure device. For instance, an infrastructure device may be identified as a PDU, serial aggregator, thermostat, network router, network switch, or other type of infrastructure device. The device information may also include more specific device information, such as a manufacture and/or model of an infrastructure device. The device information may further set forth specific capabilities of an infrastructure device.

The system configuration manager 108 may also collect operational context information for infrastructure devices and server devices. The operational context information may include information identifying how an infrastructure device is currently operating or planned to be operated within the data center. This may include information indicating whether the infrastructure device is currently in use. If in use, the operational context information may identify how the infrastructure device is being used, for instance, by specifying what functions are being provided by the infrastructure device and what servers are being supported by the infrastructure device. The operational context information may further include information identifying the operation of servers being supported by the infrastructure device. This may include information regarding whether each server device is currently being used and, if so, what operations are being performed by each server device. Beyond current operational information, the operation context information may include planned use of infrastructure devices and server devices being supported by the infrastructure devices.

The system performance manager 110 operates to collect performance information regarding various types of devices, such as the infrastructure devices 104A, 104N, and server devices, such as the server devices, 102A, 102N, within the data center and to store the performance information in the system data repository 114. The performance information comprising a plurality of metrics may be accessed by the system performance manager 110 querying infrastructure devices and/or server devices connected in the data center. Such performance metrics may include, for example, execution times, CPU utilization times, memory utilization and data volumes, among others.

The health monitoring component 112 operates to analyze the health of server devices in the data center, such as the server devices 102A, 102N, and health of infrastructure devices in the data center, such as the infrastructure devices 104A, 104N based on the operational context information collected by the system configuration manager 108 and based on the performance information collected by the system performance manager 110. A health monitoring analysis for a server and/or infrastructure device may be triggered in a number of different manners within the scope of embodiments of the present invention. In some cases, the system monitor 106 may receive information indicating that either a server device or an infrastructure device may be unhealthy. For instance, if an infrastructure device is instructed to perform a particular operation and returns a failure, this may indicate that the infrastructure device is unhealthy. Accordingly, if the system monitor 106 receives information indicating that an infrastructure device is suspected to be unhealthy, the health monitoring component 112 may perform a health analysis for that infrastructure device.

In other instances, health analysis may be performed on a periodic basis for each server device and each infrastructure device regardless of whether the server/infrastructure device is suspected to be unhealthy. For instance, a schedule may be set for monitoring the health of an infrastructure device, and a health analysis may be periodically triggered in accordance with the schedule. In some cases, a maximum time period may be set for health analysis such that a health analysis may be triggered with the time period since the last health monitoring event lapses. For example, a health analysis may be performed at one point in time for an infrastructure device based on suspecting the infrastructure device is unhealthy. After a set time period after that health analysis lapses, another health analysis may be triggered.

When a health analysis is triggered for an infrastructure device and/or server device, the health monitoring component 112 determines a health monitoring process for the server/infrastructure device based on information available for the server/infrastructure device, such as device information and/or operational context information. Generally, the health monitoring component 112 attempts to select health analysis operations sufficient to determine the health of the infrastructure device and/or server device while minimizing any disruption to the operation of the infrastructure device and/or any server devices supported by the infrastructure device.

In some instances, the health monitoring component 112 may select health analysis operations for a device (e.g., infrastructure device or server device) based at least in part on device information available. As can be understood, data centers typically include a variety of different types of infrastructure/server devices. Each of those types of devices has different functions and capabilities, and therefore the health analysis operations that can be taken will vary for the different types of devices. Additionally, different models (from the same or different manufacturers) for a particular type of device may also often have different capabilities. Therefore, the health analysis operations and performance metrics that can be taken for a particular type of server/infrastructure device may vary among different models. However, there are typically at least some health analysis operations and metrics that are common among the various models of a particular device type.

If the only device information available for an infrastructure/server device is the device type, metrics that are common for that device type may be identified as possible operations to take for the health analysis. However, if the device information specifies a particular manufacture and/or model, additional health analysis metrics may be available based on the capabilities of that manufacture/model. In some cases, the device information may specify the particular capabilities of the infrastructure device, and the possible metrics may be identified based on those specified capabilities.

According to embodiments of the present invention, the health analysis operations may also be determined based at least in part on the amount of data stored in the system repository 114. For example, as described in greater details below in conjunction with FIG. 2, the health monitoring component 112 may be configured to identify a period of time covered by metrics data stored in the system repository 114 and may be configured to categorize the stored metrics data into a plurality of non-overlapping time segments. Furthermore, the health monitoring component 112 may be configured to perform statistical analysis of the stored metrics data based on the identified period of time and may be configured to dynamically generate a range of acceptable metric values based on the performed statistical analysis.

Figure 2:
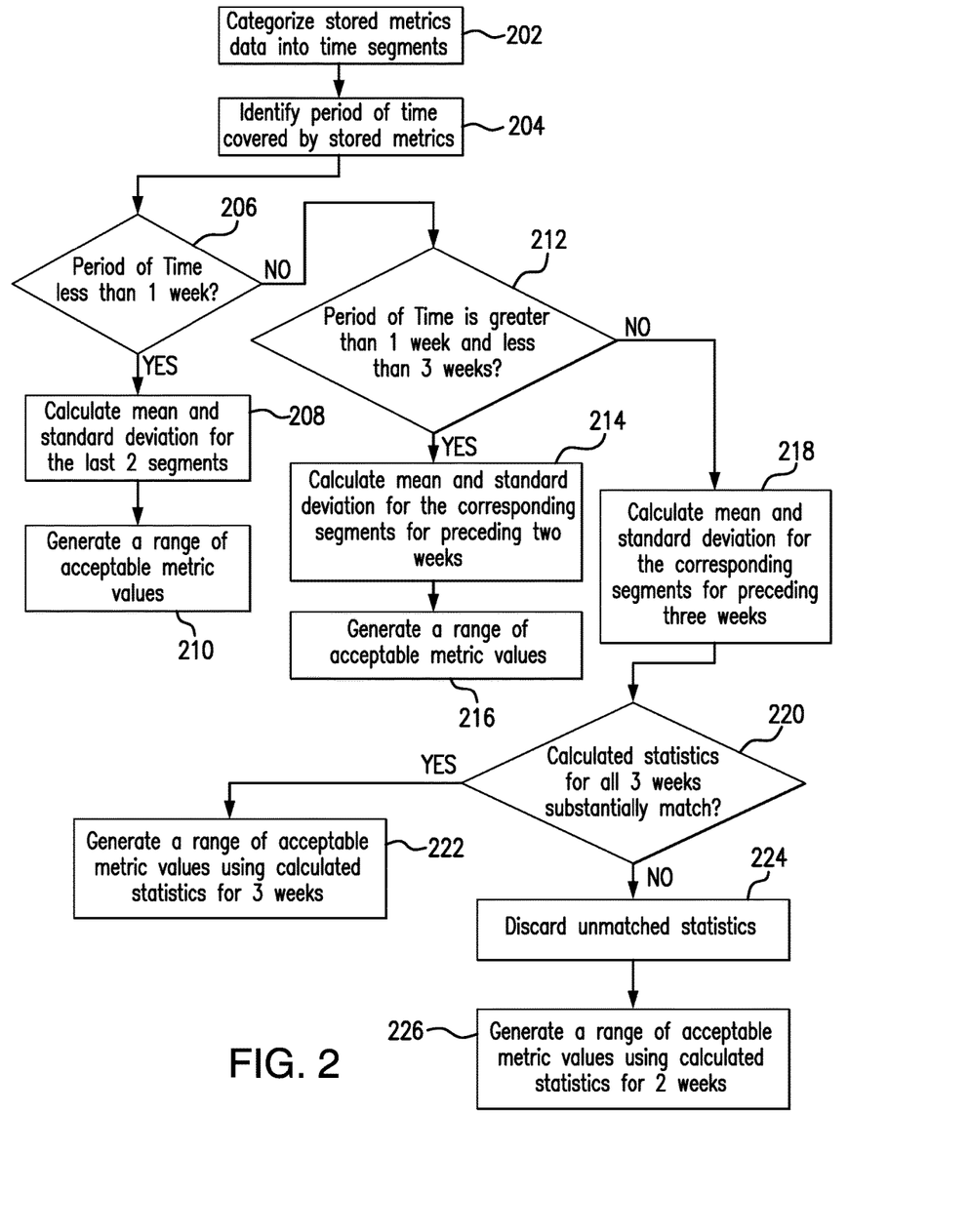
FIG. 2 is a flow diagram showing a method for continuous data anomaly detection in a data center in accordance with an embodiment of the present disclosure.

FIG. 2 is a flow diagram showing a method for continuous data anomaly detection in a data center in accordance with an embodiment of the present disclosure. Before turning to description of FIG. 2, it is noted that the flow diagram shown therein is described, by way of example, with reference to components shown in FIG. 1, although these operational steps may be carried out in any system and are not limited to the scenario shown in the aforementioned figure. Additionally, the flow diagram in FIG. 2 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 202, the health monitoring component 112 may categorize metrics stored in the system repository 114 into a plurality of time segments. In one embodiment, the health and monitoring component 112 may employ a plurality of time buckets having a particular time range to represent stored metrics. The time range can be a user-defined time range or a default time range. For example, a user can select, via a user interface of the health monitoring component 112, a time range to use for each time segment (bucket), for example, based on time-stamps associated with each collected metric. For instance, each time segment may have a time range of 15 minutes. In various embodiments, the health monitoring component 112 may utilize any of the following functions to categorize the stored metrics: sum of squares, simple sum of the data and data counts.

At step 204, the health monitoring component 112 identifies a period of time covered by the metrics stored in the system repository 114. In other words, the health monitoring component 112 determines how much data is stored within the repository 114. Advantageously, the health monitoring component 112 dynamically adjusts its' calculation approach based on the amount of available data. For example, the health monitoring component 112 may perform either a first, second or third type of calculations to generate a range of acceptable metric values depending on whether (1) there is less than 1 week of data metric values, (2) more than 1 week but less than 3 weeks of data metric values and (3) more than 3 weeks of data metric values in the system repository 114.

At step 206, the health monitoring component 112 queries the system repository 114 to determines if there is less than 1 week worth of data metrics stored therein. In response to determining that the system repository 114 holds less than 1 week worth of metrics data (decision block 206, "YES" branch), at step 208, the health monitoring component 112 computes and averages means and standard deviations for one or more metrics for the two latest time segments corresponding to previous 30 minutes, for example. The calculation of the arithmetic mean may be performed in a non-recursive manner.

According to an embodiment of the present invention, at step 210, the health monitoring component 112 may generate a range of acceptable values (baseline) for a metric based on the statistical analysis performed at step 208. The baseline may be a function of time, and may define a range of expected values for each point in time. For example, the baseline may define an upper boundary and a lower boundary. In one embodiment, the lower boundary may be calculated as the determined mean value minus X determined standard deviation values, while the upper boundary may be calculated as the determined mean value plus X determined standard deviation values. X may be a preconfigured constant value.

In response to determining that the system repository 114 holds more than 1 week worth of metrics data (decision block 206, "NO" branch), at step 212, the health monitoring component 112 queries the system repository 114 to determine if there is less than 3 weeks' worth of data metrics stored therein. In response to determining that the system repository 114 holds more than 1 week but less than 3 weeks' worth of metrics data (decision block 212, "YES" branch), at step 214, the health monitoring component 112 computes and averages means and standard deviations for one or more metrics for the corresponding time segments during the previous two weeks. The calculation of the baseline for a particular statistic for a particular time segment may be performed based on the statistical analysis of the corresponding time segments during the previous two weeks. For example, assuming current date is March 16, to determine the baseline for a 15 minute time segment between 9 am and 9:15 am on March 16, the health monitoring component 112 computes an average of means and standard deviations for the same metric for the last two week's corresponding time segments (9 am-9:15 am segments on March 9 and on March 2, respectively).

According to an embodiment of the present invention, at step 216, the health monitoring component 112 may generate a baseline for a metric based on the statistical analysis performed at step 214. In one embodiment, the lower boundary may be calculated as the determined mean value minus determined standard deviation values of the metric for the corresponding time segments for the preceding two weeks, while the upper boundary may be calculated as the determined mean value plus the determined standard deviation values of the metric for the corresponding time segments for the preceding two weeks.

In response to determining that the system repository 114 holds more than 3 weeks' worth of metrics data (decision block 212, "NO" branch), the health monitoring component 112 makes a better estimation of baselines since it has more data to work with. More specifically, at step 218, for any particular metric and any particular time segment, the health monitoring component 112 may analyze statistics of corresponding time segments within the previous three weeks data using triangular approach.

Figure 3:
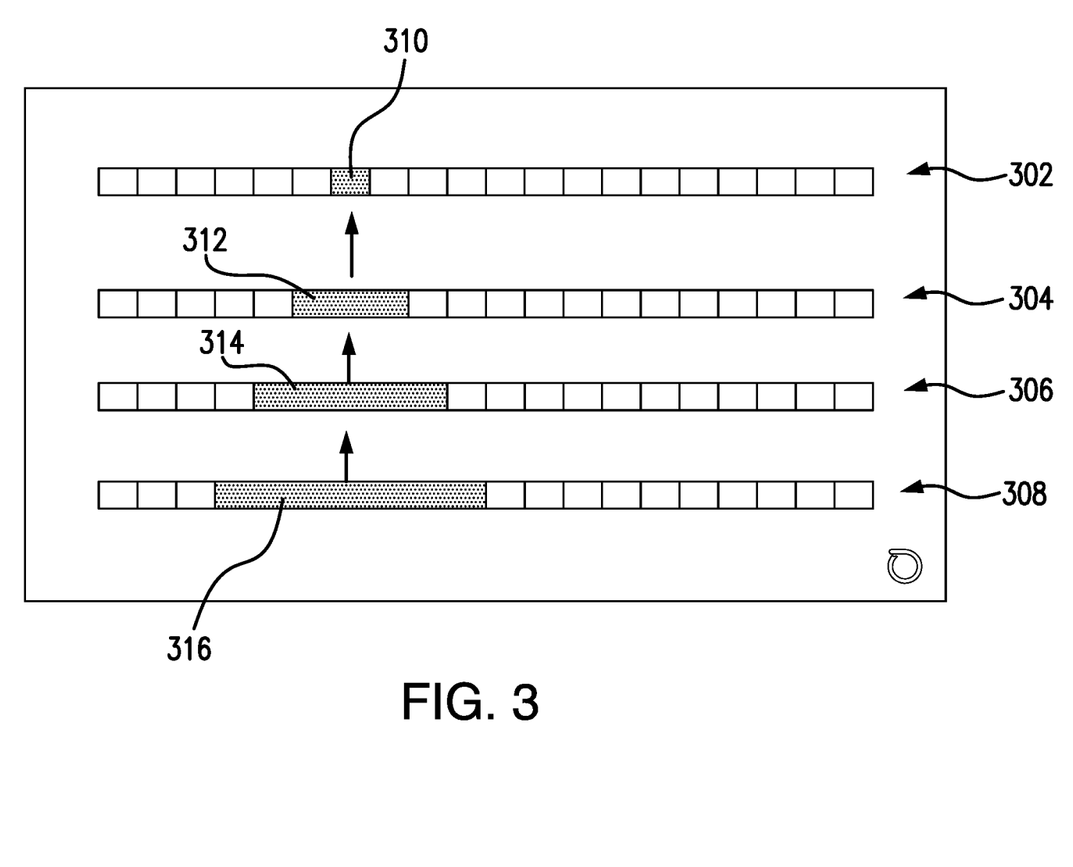
FIG. 3 illustrates a functional block diagram illustrating generation of a range of acceptable metric values for a particular metric and a particular time segment when a period of time covered by metrics data stored in a system exceeds three weeks in accordance with an embodiment of the present invention.

FIG. 3 illustrates a functional block diagram illustrating generation of a range of acceptable metric values using triangular approach for a particular metric and a particular time segment when a period of time covered by metrics data stored in a system exceeds three weeks, in accordance with an embodiment of the present invention. FIG. 3 illustrates four different data objects 302-308. The first data object 302 represents data for current week; the second data object 304 represents data for previous week; the third data object 306 represents data for the week that is two weeks before the current week; and the fourth data object 308 represents data for the week that is three weeks before the current week. Each data object includes metrics corresponding to a plurality of segments having predefined time duration (e.g., 15 minutes). For illustrative purposes only, assume that the health monitoring component 112 is tasked to generate baselines for a current time segment representing 9:00 am-9:15 am of current date, represented in FIG. 3 by time segment 310. Using the triangular approach, for the mean and standard deviation calculation purposes, in addition to using data segment corresponding to the current data segment, the health monitoring component 112 utilizes both the preceding and succeeding time segments within the second data object 304 represented by a first collection of time segments 312. Similarly, for the third 306 and fourth data objects 308 representing two more preceding weeks, in addition to using data segment corresponding to the current data segment, the health monitoring component 112 utilizes both two preceding and two succeeding time segments within the third data object 306 represented by a second collection of time segments 314 and utilizes both three preceding and three succeeding time segments within the fourth data object 308 represented by a third collection of time segments 316. According to an embodiment of the present invention, the health monitoring component 112 averages means and standard deviations for each collection of time segments 312-316 and then compares the calculated averages as described below.

Referring back to FIG. 2, at step 220, the health monitoring component 112 may compare means and/or standard deviations between the corresponding time segment collections of data objects 302-308 using a student t-test, or a Welch's t-test, in one embodiment. For example, a t-test computes a likelihood that two means are of the same true mean. In this step 220, the health monitoring component 112 may determine if the mean of the data set for the data object 308 is more than one t-value apart from the means of the data sets for the data objects 304 and 306. If so (decision block 220, "NO" branch), at step 224, the health monitoring component 112 discards statistics for the data object 308. In other words, at step 226, when calculating a range of acceptable metric values for the current time segment 310 if only two weeks data objects support each other, the health monitoring component 112 will use combined statistics of these two weeks only. In response to determining that calculated statistics for all 3 weeks support each other or if none of them do (decision block 220, "YES" branch), at step 222, the health monitoring component 112 combines statistics of all three weeks for corresponding time segments when calculating a range of acceptable metric values for the current time segment 310. Table 1 below illustrates health monitoring component's 112 decision making process with respect to how much of historical data to use. In the table below 1 means one week's data matches at least one other week's data, while "0" means an anomaly:

TABLE 1

| Description | Week 1 | Week 2 | Week 3 | Cardinality |
|---|---|---|---|---|
| This means no data from the weeks support each other | 0 | 0 | 0 | 0 |
| Weeks 2 and 3 data support each other and week 1 is anomaly | 0 | 1 | 1 | 2 |
| Weeks 1 and 2 data support each other and week 3 is anomaly | 1 | 1 | 0 | 2 |
| Weeks 1 and 3 data support each other and week 2 is anomaly | 1 | 0 | 1 | 2 |
| Data from all 3 weeks support each other | 1 | 1 | 1 | 3 |

It should be noted that in various embodiments, other reliability measures may include at least one of a Jaccard Index, a Kolmogorov-Smirnov test, or a predictive model accuracy measure.

According to an embodiment of the present invention, to aggregate the resulting estimates (of acceptable metric values) across datasets in steps 222 and 226, the health monitoring component 112 weights the independent estimates for each week using an inverse-variance weighting (IVW). Using the disclosed method, particular week's estimates having high variance will have a lower impact on the prediction on the range of acceptable metric values for the current week's segment of interest.

As a more specific example, at step 222, the health monitoring component 112 utilizes the IVW to determine the mean for current week's time segment 310 and to average the variances of corresponding time segments within the data objects 304-308 for determining the expected variance. After obtaining the expected variance and mean of the current week's time segment 310, a dynamic range of acceptable metric values may be set by using mean plus/minus 2 standard deviations. In this case, any analyzed measurement for this metric having a value plus/minus 4 standard deviations of the mean will be identified as unusual or anomaly by the health monitoring component 112.

In view of the above, embodiments of the present invention provide more efficient technique of creating meaningful dynamic ranges of acceptable metric values. This technique provides valuable information right away, but its performance improves over time, once more data is available. Embodiments described herein use variations in generation of such dynamic ranges in a way that helps detect an odd behavior of a particular infrastructure device, while at the same time minimizing "false positives" where data center support personnel is notified about something that is not really a problem.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for continuous data anomaly detection, the method comprising steps of:
   identifying, by a processor, a period of time covered by metrics data stored in a repository wherein the period of time is greater than three weeks;
   categorizing, by a processor, the stored metrics data into a plurality of non-overlapping time segments wherein each of the plurality of non-overlapping time segments represents a predefined number of minutes;
   performing, by a processor, statistical analysis of the stored metrics data based on the identified period of time including calculating a mean and a standard deviation of the stored metrics for corresponding time segments for preceding three weeks;
   dynamically generating, by a processor, a range of acceptable metric values based on the performed statistical analysis wherein an upper and lower boundary of the range is calculated based on the mean plus/minus the standard deviations of the metric, respectively, for the corresponding time segments for a first, second and third weeks, wherein the first week comprises a week immediately before a current week, the second week comprises a week that is two weeks before the current week and the third week comprises a week that is three weeks before the current week such that wherein performing the statistical analysis of a particular stored metric data for a particular time segment within a current week includes:
   calculating a mean and a standard deviation of the metric for the corresponding time segment, a time segment preceding the corresponding time segment and a time segment succeeding the corresponding time segment within the first week;
   calculating a mean and a standard deviation of the metric for the corresponding time segment, two time segments preceding the corresponding time segment and two time segments succeeding the corresponding time segment within the second week;
   calculating a mean and a standard deviation of the metric for the corresponding time segment, three time segments preceding the corresponding time segment and three time segments succeeding the corresponding time segment within the third week;
   discarding the calculated mean and standard deviation for the three time segments succeeding the corresponding time segment based upon predetermined criteria; and
   selectively combining the calculated means and standard deviations for the current week and for the first, second and third weeks.

2. The method of claim 1, wherein the period of time is less than one week, wherein each of the plurality of non-overlapping time segments represents a predefined number of minutes and wherein performing the statistical analysis of a particular stored metric data comprises calculating a mean and a standard deviation of the metric for the two latest time segments.

3. The method of claim 2, wherein an upper boundary of the range is calculated based on the mean plus a predefined number of standard deviations, and wherein a lower boundary of the range is calculated based on the mean minus the predefined number of standard deviations.

4. The method of claim 1, wherein the period of time is greater than one week and less than three weeks, wherein each of the plurality of non-overlapping time segments represents a predefined number of minutes and wherein performing the statistical analysis of a particular stored metric data for a particular time segment comprises calculating a mean and a standard deviation of the metric for the corresponding time segments for preceding two weeks.

5. The method of claim 4, wherein an upper boundary of the range is calculated based on the mean plus the standard deviations of the metric for the corresponding time segments for the preceding two weeks, and wherein a lower boundary of the range is calculated based on the mean minus the standard deviations of the metric for the corresponding time segments for the preceding two weeks.

6. The method of claim 1, wherein the step of selectively combining the calculated means and standard deviations comprises a selective inverse variance weighted mean calculation and a selective inverse variance weighted standard deviation calculation.

7. The method of claim 6, wherein the calculated means and standard deviations are combined based on results of an automatically applied hypothesis test.

* * * * *